(12) United States Patent
Hendry et al.

(10) Patent No.: US 12,069,283 B2
(45) Date of Patent: *Aug. 20, 2024

(54) VIDEO DECODING METHOD AND APPARATUS USING THE SAME

(71) Applicant: LG Electronics Inc., Seoul (KR)

(72) Inventors: Hendry Hendry, Seoul (KR); Yongjoon Jeon, Seoul (KR); Chulkeun Kim, Seoul (KR); Jungsun Kim, Seoul (KR); Byeongmoon Jeon, Seoul (KR); Joonyoung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 431 days.

This patent is subject to a terminal disclaimer.

(21) Appl. No.: 17/578,182

(22) Filed: Jan. 18, 2022

(65) Prior Publication Data

US 2022/0141478 A1    May 5, 2022

Related U.S. Application Data

(63) Continuation of application No. 16/773,704, filed on Jan. 27, 2020, now Pat. No. 11,259,038, which is a
(Continued)

(51) Int. Cl.
*H04N 19/44* (2014.01)
*H04N 19/105* (2014.01)
(Continued)

(52) U.S. Cl.
CPC .......... *H04N 19/44* (2014.11); *H04N 19/105* (2014.11); *H04N 19/157* (2014.11);
(Continued)

(58) Field of Classification Search
CPC .. H04N 19/105; H04N 19/157; H04N 19/172; H04N 19/174; H04N 19/176;
(Continued)

(56) References Cited

U.S. PATENT DOCUMENTS 7,376,186 B2    5/2008    Boyce
7,903,742 B2    3/2011    Boyce
(Continued)

FOREIGN PATENT DOCUMENTS

JP    2012054982    3/2012
KR    100803611    2/2008
(Continued)

OTHER PUBLICATIONS

Allowance of Patent dated Jul. 7, 2015 from corresponding Korean Patent Application No. 10-2015-7002026, 8 pages.
(Continued)

*Primary Examiner* — William C Vaughn, Jr.
*Assistant Examiner* — Naod W Belai
(74) *Attorney, Agent, or Firm* — Fish & Richardson P.C.

(57) ABSTRACT

Disclosed is a video decoding method that decodes a bitstream, the method including receiving a picture parameter set (PPS) comprising at least one of first information indicating whether the same reference picture list is applied to slices comprised in a picture and second information indicating whether additional information on modification of the reference picture list is present, and deriving a construction of the reference picture list based on the PPS. Accordingly, there are provided a method and an apparatus for signaling by a picture whether the construction of the reference picture list is modified when constructing the reference picture list.

14 Claims, 8 Drawing Sheets

Related U.S. Application Data continuation of application No. 16/540,499, filed on Aug. 14, 2019, now Pat. No. 10,567,783, which is a continuation of application No. 15/845,770, filed on Dec. 18, 2017, now Pat. No. 10,390,032, which is a continuation of application No. 15/418,888, filed on Jan. 30, 2017, now Pat. No. 9,848,200, which is a continuation of application No. 14/352,586, filed as application No. PCT/KR2013/008672 on Sep. 27, 2013, now Pat. No. 9,560,369.

(60) Provisional application No. 61/706,783, filed on Sep. 28, 2012.

(51) Int. Cl.

| | | |
|---|---|---|
| *H04N 19/157* | (2014.01) | |
| *H04N 19/172* | (2014.01) | |
| *H04N 19/174* | (2014.01) | |
| *H04N 19/176* | (2014.01) | |
| *H04N 19/463* | (2014.01) | |
| *H04N 19/523* | (2014.01) | |
| *H04N 19/58* | (2014.01) | |
| *H04N 19/587* | (2014.01) | |
| *H04N 19/70* | (2014.01) | |
| *H04N 19/513* | (2014.01) | |
| *H04N 19/573* | (2014.01) | |

(52) U.S. Cl.
CPC ......... *H04N 19/172* (2014.11); *H04N 19/174* (2014.11); *H04N 19/176* (2014.11); *H04N 19/463* (2014.11); *H04N 19/523* (2014.11); *H04N 19/58* (2014.11); *H04N 19/587* (2014.11); *H04N 19/70* (2014.11); *H04N 19/513* (2014.11); *H04N 19/573* (2014.11)

(58) Field of Classification Search
CPC .... H04N 19/44; H04N 19/463; H04N 19/513; H04N 19/523; H04N 19/573; H04N 19/58; H04N 19/587; H04N 19/70
USPC ..................................................... 375/240.02
See application file for complete search history.

(56) References Cited

U.S. PATENT DOCUMENTS

| | | |
|---|---|---|
| 8,144,785 B2 | 3/2012 | MacDonald |
| 8,144,786 B2 | 3/2012 | MacDonald |
| 8,144,787 B2 | 3/2012 | MacDonald |
| 8,149,924 B2 | 3/2012 | MacDonald |
| 8,155,208 B2 | 4/2012 | MacDonald |
| 8,290,050 B2 | 10/2012 | Boyce |
| 8,290,051 B2 | 10/2012 | Boyce |
| 8,290,052 B2 | 10/2012 | Boyce |
| 8,290,053 B2 | 10/2012 | Boyce |
| 8,295,354 B2 | 10/2012 | Boyce |
| 8,406,301 B2 | 3/2013 | Boyce |
| 2004/0008782 A1 | 1/2004 | Boyce |
| 2004/0008783 A1 | 1/2004 | Boyce |
| 2004/0008786 A1 | 1/2004 | Boyce |
| 2011/0019731 A1 | 1/2011 | Boyce |
| 2011/0019732 A1 | 1/2011 | Boyce |
| 2011/0019733 A1 | 1/2011 | Boyce |
| 2011/0019734 A1 | 1/2011 | Boyce |
| 2011/0019743 A1 | 1/2011 | Boyce |
| 2011/0026586 A1 | 2/2011 | Boyce |
| 2011/0026587 A1 | 2/2011 | Boyce |
| 2011/0026588 A1 | 2/2011 | Boyce |
| 2011/0026589 A1 | 2/2011 | Boyce |
| 2011/0026590 A1 | 2/2011 | Boyce |
| 2012/0069903 A1 | 3/2012 | Lim |
| 2012/0250773 A1 | 10/2012 | Chien |
| 2013/0188881 A1 | 7/2013 | Zhao |
| 2013/0202035 A1 | 8/2013 | Chen |
| 2013/0287104 A1 | 10/2013 | Jeong |
| 2015/0016505 A1 | 1/2015 | Sjoberg |
| 2015/0071351 A1 | 3/2015 | Lee |

FOREIGN PATENT DOCUMENTS

| | | |
|---|---|---|
| KR | 20110139304 | 12/2011 |
| KR | 20120017407 | 2/2012 |
| KR | 20120078647 | 7/2012 |
| KR | 20120104128 | 9/2012 |
| KR | 20130050863 | 5/2013 |
| WO | WO2004008642 | 1/2004 |
| WO | WO2004008761 | 1/2004 |
| WO | WO2010123203 | 10/2010 |
| WO | WO2012023817 | 5/2012 |

OTHER PUBLICATIONS

Benjamin Bross et al., "High Efficiency Video Coding (HEVC) Text Specification Draft 6", Joint Collaborative Team an Video Coding (JCT-VC) ofITU-T SG16 WP3 and ISO-Lec JTC1/SC29/WG11, 8th Meeting: San Jose, CA, USA, Feb. 1-10, 2012 (JCTVC-H1003), 259 pages.

Benjamin Bross et al., Joint Collaborative Team on Video Coding ((JCTVC-H1003), ofITU-T SG 16 WP3 and ISO/IEC JTC1/SC29/WG11, 8th Meeting: San Jose, CA, USA, Feb. 1-10, 2012, 259 pages.

Hendry et al.; "AH G 9: On Restricted Reference Picture List", Joint Collaborative Team an Video Coding (JCTVC-K0170) ofITU-T SG 16 WP 3 and ISO/IEC JTC 1/SC 29/WG 11, 11th Meeting: Shanghai, CN, Oct. 10-19, 2012.

International Search Report dated Jan. 16, 2014 for Application No. PCT /KR2013/008672, 5 pages.

Korean Notice of Allowance dated Jul. 7, 2015 for Korean Application No. 10-2015-7002026, 6 Pages.

Notice of Office Action dated Apr. 8, 2015 from corresponding Korean Patent Application No. 10-2015-7002026, 11 pages.

Office Action dated Apr. 8, 2015 from corresponding Korean Patent Application No. 10-2015-7002026, 6 pages.

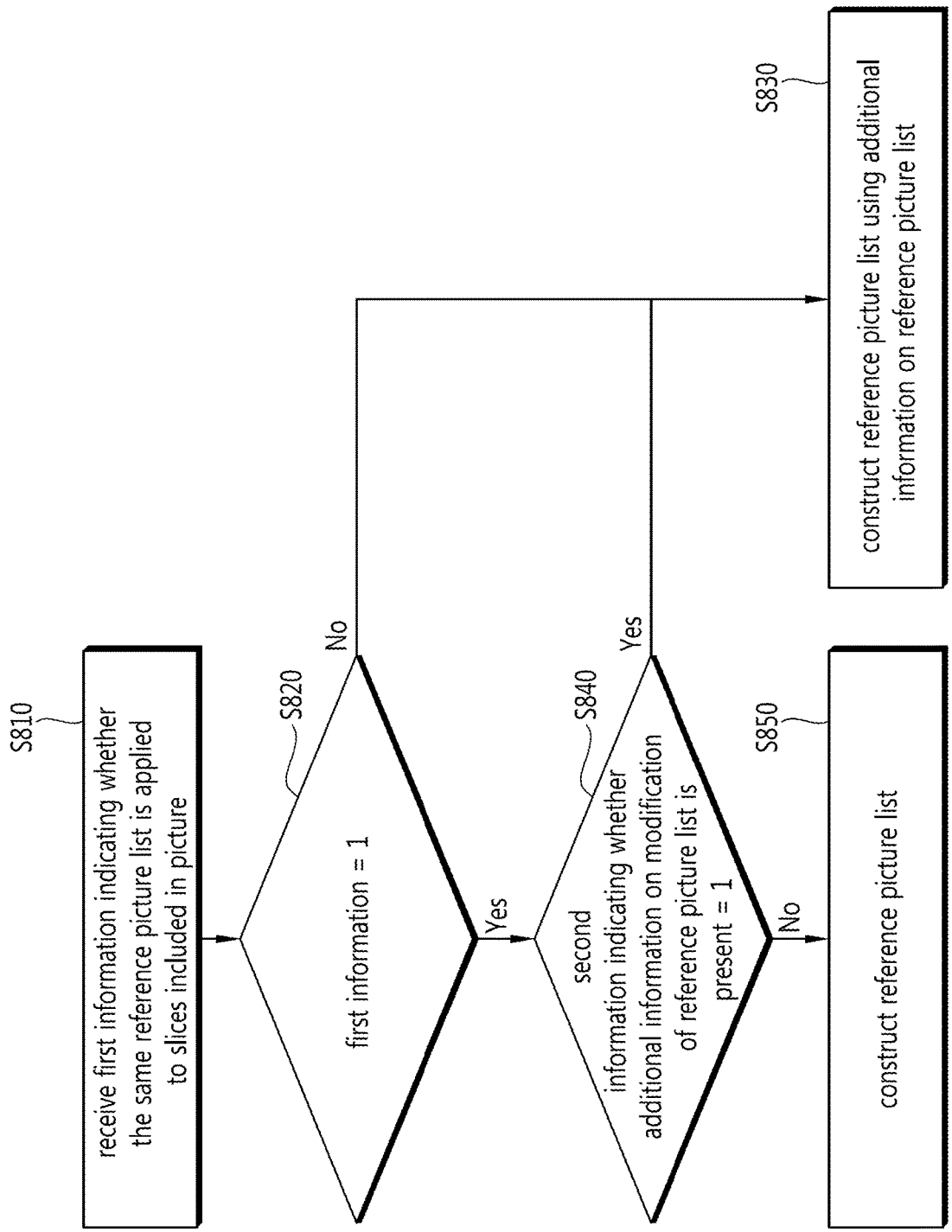

VIDEO DECODING METHOD AND APPARATUS USING THE SAME

CROSS REFERENCE TO RELATED APPLICATIONS

This application is a continuation of U.S. application Ser. No. 16/773,704, filed on Jan. 27, 2020, which is a continuation of U.S. application Ser. No. 16/540,499, filed on Aug. 14, 2019, now U.S. Pat. No. 10,567,783, which is continuation of U.S. application Ser. No. 15/845,770, filed Dec. 18, 2017, now U.S. Pat. No. 10,390,032, which is a continuation of U.S. application Ser. No. 15/418,888, filed Jan. 30, 2017, now U.S. Pat. No. 9,848,200, which is a continuation of U.S. application Ser. No. 14/352,586, filed Apr. 17, 2014, now U.S. Pat. No. 9,560,369, which is a U.S. National Phase Application of International Application No PCT/KR2013/008672, filed on Sep. 27, 2013, which claims the benefit of U.S. Provisional Application No. 61/706,783, filed on Sep. 28, 2012, the entire contents of which are hereby incorporated by reference.

TECHNICAL FIELD

The present invention relates to a video compression technique, and more particularly, to a method and an apparatus for signaling reference picture list information.

Background Art

Recently, demands for high-resolution and high-quality pictures have increased in various fields of applications. As pictures have higher resolution and higher quality, the amount of information on the pictures also increases.

With a growing amount of information, multi-functional devices and networks with various environments are introduced. Accordingly, the same content may be utilized with different levels of quality.

Specifically, as terminals are able to support diverse qualities of pictures and various network environments are established, a picture with general quality is enabled in one environment while a higher-quality picture may be available in another environment.

For example, a user may enjoy video content purchased through a portable terminal on a large-screen display with higher resolution at home.

In recent years, as high definition (HD) broadcast services are available, a large number of users are getting used to high-resolution and high-quality videos and service providers and service users also pay attention to ultrahigh-definition (UHD) services having a resolution four times higher than HDTV.

Thus, there is a need to provide scalability to video quality, for example, the image quality, resolution, size and frame rate of a video, based on high-efficiency encoding and decoding methods on a high-capacity video so as to offer varied qualities of video services in different environments for users' demands.

DISCLOSURE

Technical Problem

An aspect of the present invention is to provide a method and an apparatus for describing reference picture list information in a bitstream.

Another aspect of the present invention is to provide a method and an apparatus for signaling by a picture whether modification of construction of a reference picture list occurs when constructing the reference picture list.

Still another aspect of the present invention is to provide a method of modifying a construction of a reference picture list corresponding to characteristics of pictures when the reference picture list is constructed, and an apparatus using the same.

Technical Solution

An embodiment of the present invention provides a video decoding method that decodes a bitstream, the method including receiving a picture parameter set (PPS) including at least one of first information indicating whether the same reference picture list is applied to slices included in a picture and second information indicating whether additional information on modification of the reference picture list is present; and deriving a construction of the reference picture list based on the PPS.

The second information may be included in the PPS.

The first information may be included in a video usability information (VUI) parameter.

The deriving of the construction of the reference picture list may derive the construction of the reference picture list once for one picture when the first information is 1.

The second information may be received when the first information is 1.

The deriving of the construction of the reference picture list may derive the construction of the reference picture list by each slice included in the picture when the first information is 0.

Another aspect of the present invention is to provide a video decoding apparatus that decodes a bitstream, the apparatus including a parsing module to parse a PPS including at least one of first information indicating whether the same reference picture list is applied to slices included in a picture and second information indicating whether additional information on modification of the reference picture list is present; and a prediction module to derive a construction of the reference picture list based on the first information and the second information included in the PPS.

Advantageous Effects

An embodiment of the present invention provides a method and an apparatus for describing reference picture list information in a bitstream.

Another embodiment of the present invention provides a method and an apparatus for signaling by a picture whether modification of construction of a reference picture list occurs when constructing the reference picture list.

Still another embodiment of the present invention provides a method of modifying a construction of a reference picture list corresponding to characteristics of pictures when the reference picture list is constructed, and an apparatus using the same.

DESCRIPTION OF DRAWINGS

FIG. 8 is a flowchart illustrating a video decoding method according to an exemplary embodiment of the present invention.

MODE FOR INVENTION

Figure 1:
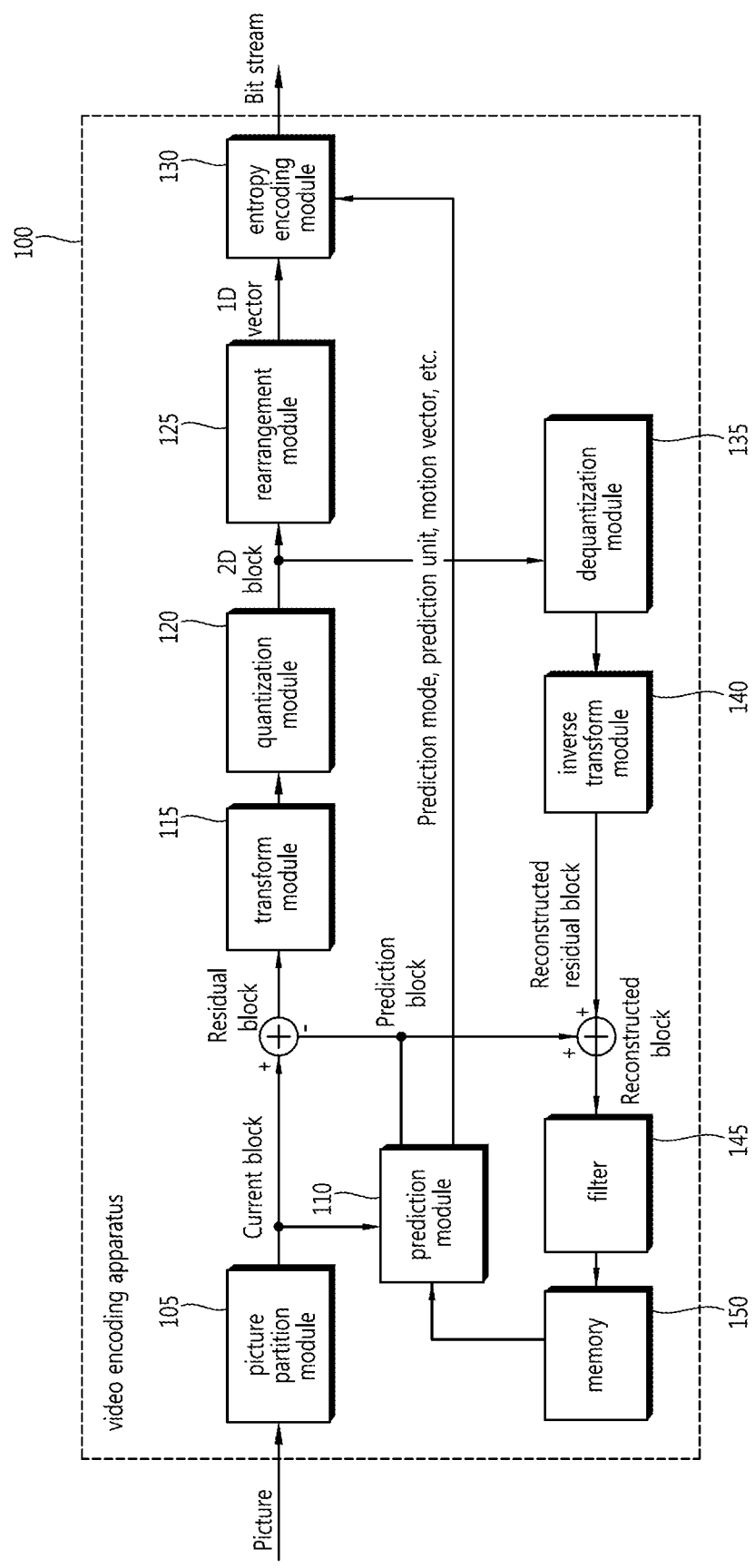
FIG. 1 is a block diagram schematically illustrating a video encoding apparatus according to an exemplary embodiment of the present invention.

The present invention may be changed and modified variously and be illustrated with reference to different exemplary embodiments, some of which will be described in detail and shown in the drawings. However, these embodiments are not intended for limiting the invention. The terminology used herein is for the purpose of describing particular embodiments only and is not intended to be limiting the technical idea of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, components, and/or combinations thereof, but do not preclude the presence or addition of one or more other features, integers, steps, operations, elements, components, and/or combinations thereof.

Although elements illustrated in the drawings are independently shown for convenience of description of different distinctive functions in the video encoding apparatus/decoding apparatus, such a configuration does not indicate that each element is constructed by a separate hardware constituent or software constituent. That is, at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Hereinafter, exemplary embodiments of the invention will be described in detail with reference to the accompanying drawings. Like reference numerals in the drawings refer to like elements throughout, and redundant descriptions of like elements will be omitted herein.

FIG. 1 is a block diagram schematically illustrating a video encoding apparatus according to an exemplary embodiment of the present invention. A scalable video encoding/decoding method or apparatus may be realized by extension of a general video encoding/decoding method or apparatus that does not provide scalability, and FIG. 1 illustrates an example of a video encoding apparatus as a base of a scalable video encoding apparatus.

Referring to FIG. 1, the video encoding apparatus 100 includes a picture partition module 105, a prediction module 110, a transform module 115, a quantization module 120, a rearrangement module 125, an entropy encoding module 130, a dequantization module 135, an inverse transform module 140, a filter 145 and a memory 150.

The picture partition module 105 may divide an input picture into at least one block as a process unit. Here, the block as the process unit may be a prediction unit (PU), a transform unit (TU) or a coding unit (CU).

Process unit blocks divided by the picture partition module 105 may have a quadtree structure.

The prediction module 110 may include an inter prediction module to perform inter prediction and an intra prediction module to perform intra prediction, which will be described. The prediction module 110 generates a prediction block by perconstructing prediction on the process unit of the picture from the partition module 105. A process unit of the picture in the prediction module 110 may be a CU, a TU or a PU. Furthermore, the prediction module 110 may determine whether prediction to be performed on the process unit is inter prediction or intra prediction, and may determine details (for example, prediction mode) of each prediction method. Here, a process unit on which prediction is performed may be different from a process unit for which a prediction method and details on the prediction methods are determined. For example, a prediction method and a prediction mode may be determined for each PU, while prediction may be performed on each TU.

In inter prediction, a prediction block may be generated by perconstructing prediction based on information on at least one of previous and/or subsequent pictures of the current picture. Furthermore, in intra prediction, a prediction block may be generated by perconstructing prediction based on information on a pixel within the current picture.

A skip mode, a merge mode and a motion vector prediction (MVP) may be used as an inter prediction method. In inter prediction, a reference picture may be selected for a PU, and a reference block corresponding to the PU may be selected. The reference block may be selected in an inter pixel unit. Subsequently, a prediction block that has a minimum residual signal with respect to the current PU and has a minimum-size motion vector is generated.

The prediction block may be generated in an integer sample unit or in a pixel unit smaller than an integer pixel, such as a ½ pixel unit and a ¼ pixel unit. Here, the motion vector may be represented in a unit smaller than an integer pixel.

Information on the reference pixel selected in inter prediction, such as an index, a motion vector (e.g., a motion vector predictor) and a residual signal of the reference picture, is subjected to entropy encoding and transferred to a decoding apparatus. In the skip mode, since the prediction block may be a reconstructed block regardless of a residual block, the residual block may not be generated, transformed, quantized and transferred.

In intra prediction, a prediction mode is determined by a PU, and prediction may be performed by a PU. Alternatively, a prediction mode may be determined by a PU, and intra prediction may be performed in a TU.

An intra prediction mode may have 33 directional prediction modes and two or more non-directional modes. The non-directional modes can include a DC prediction mode and a planar mode.

In intra prediction, the prediction block may be generated after applying a filter to a reference sample. Here, whether or not to apply the filter to the reference sample may be determined on an intra prediction mode and/or size of a current block.

A residual value (or a residual block or a residual signal) between the generated prediction block and an original block is input to the transform module 115. Also, information on a prediction mode and information on a motion vector used for the prediction, along with the residual value, are encoded by the entropy encoding module 130 and transferred to the decoding apparatus.

The transform module 115 transforms the residual block by the TU and generates a transform coefficient.

A transform block is a rectangular block of samples, which the same transformation is applied to. The transform block may be a TU and have a quadtree structure.

The transform module 115 may perform transformation based on a prediction mode applied to the residual block and a size of the block.

For example, when intra prediction is applied to the residual block and the block has a 4×4 residual array, the transform module 115 may transform the residual block using discrete cosine transform (DCT). Otherwise, the transform module 115 may transform the residual block using discrete sine transform (DST).

The transform module 115 may generate a transform block of transform coefficients by transformation.

The quantization module 120 may generate quantized transform coefficients by quantizing residual values transformed by the transform module 115, that is, the transform coefficients. The coefficients derived by the quantization module 120 are provided to the dequantization module 135 and the rearrangement module 125.

The rearrangement module 125 rearranges the quantized transform coefficients provided by the quantization module 120. Rearranging the quantized transform coefficients may enhance encoding efficiency in the entropy encoding module 130.

The rearrangement module 125 may rearrange a two-dimensional (2D) block of the quantized transform coefficients into a one-dimensional (1D) vector using coefficient scanning.

The entropy encoding module 130 may perform entropy encoding on symbols according to probability distribution based on the quantized transform coefficients rearranged by the rearrangement module 125 or encoding parameter values derived during the encoding process to output bitstreams. Entropy encoding is a method of receiving symbols having different values and representing the symbols as a decodable binary sequence or string while removing statistical redundancy.

Here, a symbol means a syntax element as an encoding/decoding target, a coding parameter, a value of a residual signal, or the like. A coding parameter, which is a parameter necessary for encoding and decoding, may include information encoded by the encoding apparatus and transferred to the decoding apparatus, such as a syntax element, and information derived during a encoding or decoding process and means information necessary for encoding and decoding a picture. The coding parameter may include, for example, values or statistics of an intra/inter prediction mode, a movement/motion vector, a reference picture index, an encoding block pattern, presence and absence of a residual signal, a quantized transform parameter, a block size and block partition information. A residual signal may denote a difference between an original signal and a prediction signal, a signal obtained by transconstructing the difference between the original signal and the prediction signal, or a signal obtained by transconstructing and quantizing the difference between the original signal and the prediction signal. The residual signal may be referred to as a residual block in a block unit.

When entropy encoding is applied, symbols are represented by allocating a small number of bits to symbols having a high probability and allocating a large number of bits to symbols having a low probability, thereby reducing a size of bit strings for symbols to be encoded. Therefore, entropy encoding may enhance compression performance of video encoding.

Encoding methods, such as exponential Golomb, context-adaptive variable length coding (CAVLC) and context-adaptive binary arithmetic coding (CABAC), may be used for entropy encoding. For example, the entropy encoding module 130 may store a table used for perconstructing entropy encoding, such as a variable length coding/code (VLC) table, and the entropy encoding module 130 may perform entropy encoding using the stored VLC table. In addition, the entropy encoding module 130 may derive a binarization method for a target symbol and a probability model for a target symbol/bin and perform entropy encoding using the derived binarization method or probability model.

Here, binarization means representing values of symbols as a bin sequence/string. A bin means each bin value (0 or 1) when a symbol is represented as a bin sequence/string through binarization.

A probability model means a predicted probability of a symbol/bin as an encoding/decoding target that may be derived through context information/context model. Context information/context model is information for determining a probability of a symbol/bin as an encoding/decoding target.

In more detail, CABAC as an entropy encoding method transforms a symbol that is not binarized into a bin by binarization, determines a context model using encoding information on a neighboring block and a block to be encoded or information on a symbol/bin encoded in a previous stage, and predicts a probability of a bin according to the determined context model to perform arithmetic encoding of the bin, thereby generating a bitstream. Here, CABAC may determine the context model, and then update the context model using information on an encoded symbol/bin for a context model for a next symbol/bin.

Furthermore, the entropy coding module 130 may apply a change to a received parameter set or syntax as necessary.

The dequantization module 135 performs dequantization on the values (transform coefficients) quantized by the quantization module 120, and the inverse transform module 140 performs inverse transform on the values dequantized by the dequantization module 135.

The residual values generated via the dequantization module 135 and the inverse transform module 140 are merged with the prediction block predicted by the prediction module 110 to generate a reconstructed block.

FIG. 1 illustrates that the reconstructed block is generated by merging the residual block with the prediction block through an adder. Here, the adder may be regarded as a separate module for generating the reconstructed block (reconstructed block generation module).

The filter 145 may apply a deblocking filter, an adaptive loop filter (ALF), and a sample adaptive offset (SAO) to a reconstructed picture.

The deblocking filter may remove block distortion generated on boundaries between blocks in the reconstructed picture. The ALF may perform filtering based on a value obtained by comparing the reconstructed picture with blocks filtered by the deblocking filter with the original picture. The ALF may be employed only for high efficiency. The SAO reconstructs an offset difference between the residual block which has been subjected to the deblocking filter and the original picture by a pixel unit, in which a band offset or an edge offset is used.

Meanwhile, the filter 145 may not apply filtering to a reconstructed block used in inter prediction.

The memory 150 may store the reconstructed block or picture derived through the filter 145. The reconstructed block or picture stored in the memory 150 may be provided to the prediction module 110 perconstructing inter prediction.

Figure 2:
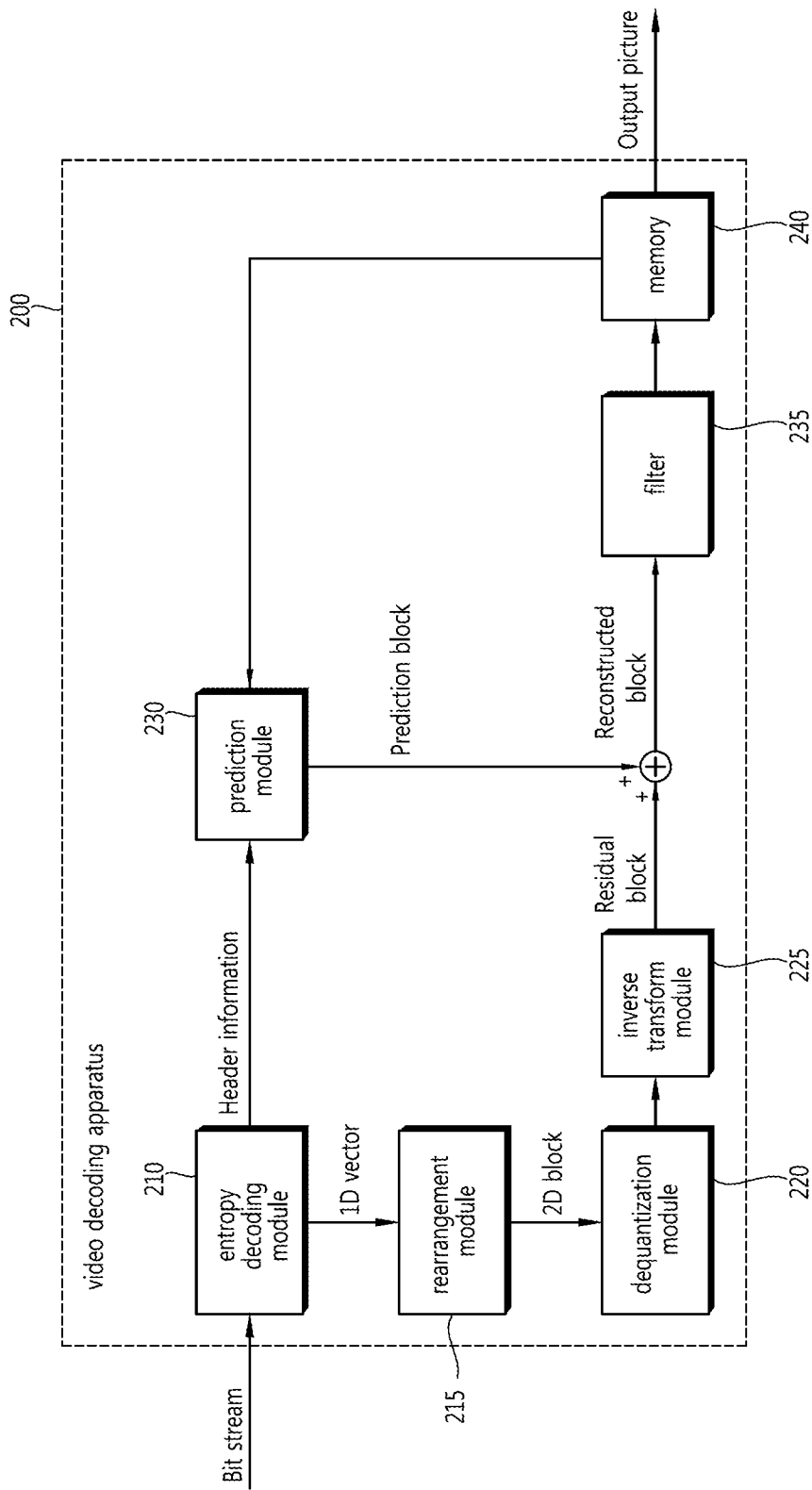
FIG. 2 is a block diagram schematically illustrating a video decoding apparatus according to an exemplary embodiment of the present invention.

FIG. 2 is a block diagram schematically showing a video decoding apparatus according to an exemplary embodiment of the present invention. As described above in FIG. 1, a scalable video encoding/decoding method or apparatus may be realized by extension of a general video encoding/decoding method or apparatus that does not provide scalability, and FIG. 2 illustrates an example of a video decoding apparatus as a base of a scalable video decoding apparatus.

Referring to FIG. 2, the video decoding apparatus 200 may include an entropy decoding module 210, a rearrangement module 215, an dequantization module 220, an inverse transform module 225, a prediction module 230, a filter 235, and a memory 240.

When a video bitstream is input from the video encoding apparatus, the input bitstream may be decoded according to an inverse procedure by which the video encoding apparatus processes video information.

The entropy decoding module 210 performs entropy decoding on an input bitstream according to probability distribution to generate symbols including quantized coefficient type of symbols. Entropy decoding is a method of receiving a binary sequence or string and generating each symbol. Entropy decoding is similar to entropy encoding described above.

For example, if the video encoding apparatus uses variable length coding (VLC), such as CAVLC, to perform entropy encoding, the entropy decoding module 210 may perform entropy decoding by implementing the same VLC table as used in the encoding apparatus. Furthermore, if the video encoding apparatus uses CABAC to perform entropy ending, the entropy decoding module 210 may also perform entropy decoding using CABAC.

In more detail, CABAC as an entropy decoding method may receive a bin corresponding to each syntax element in the bitstream, determines a context model using information on a syntax element to be decoded and decoding information on a neighboring block and a block to be decoded or information on a symbol/bin decoded in a previous stage, and predict a probability of a bin according to the determined context model to perform arithmetic decoding of the bin, thereby generating a symbol corresponding to a value of each syntax element. Here, CABAC may determine the context model, and then update the context model using information on a decoded symbol/bin for a context model for a next symbol/bin.

When entropy decoding is applied, symbols are represented by allocating a small number of bits to symbols having a high probability and allocating a large number of bits to symbols having a low probability, thereby reducing a size of bit strings for each symbol. Therefore, entropy decoding may enhance compression performance of video decoding.

Information for generating a prediction block, among pieces of information decoded by the entropy decoding module 210, may be provided to the prediction module 230. Residual values entropy-decoded by the entropy decoding module 210, that is, quantized transform coefficients, may be input to the rearrangement module 215.

The rearrangement module 215 may rearrange the information on the bitstream entropy-decoded by the entropy decoding module 210, that is, the quantized transform coefficients, based on a rearrangement method used in the encoding apparatus.

The rearrangement module 215 may reconstruct and rearrange coefficients expressed in a 1D vector form into coefficients in a 2D block. The rearrangement module 215 may generate the coefficients in the 2D block (quantized transform coefficients) by scanning the coefficients based on a prediction mode and a size of a transform block applied to the current block (transform block).

The dequantization module 220 may perform dequantization based on a quantization parameter provided from the encoding apparatus and the rearranged coefficients of the block.

The inverse transform module 225 may perform inverse DCT and/or inverse DST on a result of quantization performed by the video encoding apparatus, having been subjected to DCT and DST performed by the transform module of the encoding apparatus.

Inverse transform may be performed on the basis of a transfer unit or a partition unit of a picture determined by the video encoding apparatus. The transform module of the video encoding apparatus may selectively perform DCT and/or DST depending on a plurality of information elements, such as a prediction method, a size of the current block and a prediction direction, and the inverse transform module 225 of the video decoding apparatus may perform inverse transform on the basis of information on the transform performed by the transform module of the video encoding apparatus.

The prediction module 230 may generate a prediction block based on information about generation of the prediction block provided from the entropy decoding module 210 and information on a previously decoded block and/or picture provided by the memory 240.

If a prediction mode for a current PU is an intra prediction mode, intra prediction may be performed based on information on a pixel in a current picture to generate the prediction block.

If a prediction mode for the current PU is an inter prediction mode, inter prediction for the current PU may be performed based on information included in at least one of previous and subsequent pictures of the current picture. Here, motion information necessary for the inter prediction for the current PU provided by the video encoding apparatus, for example, information on a motion vector and an index of a reference picture, may be derived by checking a skip flag and a merge flag received from the encoding apparatus.

A reconstructed block may be generated using the prediction block generated by the prediction module 230 and the residual block provided by the inverse transform module 225. FIG. 2 illustrates that the reconstructed block is generated by merging the prediction block with the residual block by the adder. Here, the adder may be regarded as a separate module for generating the reconstructed block (reconstructed block generation module).

When the skip mode is used, the residual block is not transmitted and the prediction block is the reconstructed block.

The reconstructed block and/or picture may be provided to the filter 235. The filter 235 may apply deblocking filtering, SAO and/or AFL to the reconstructed block and/or picture.

The memory 240 may store the reconstructed picture or block to be used as a reference picture or a reference block and supply the reconstructed picture to an output unit.

Components directly related to video decoding among the entropy decoding module 210, the rearrangement module 215, the dequantization module 220, the inverse transform module 225, the prediction module 230, the filter 235 and the memory 240 of the decoding apparatus 200, for example, the entropy decoding module 210, the rearrangement module 215, the dequantization module 220, the inverse transform module 225, the prediction module 230 and the filter 235 may be defined as a decoder or a decoding unit, separately from the other components.

Further, the decoding apparatus 200 may further include a parsing module (not shown) to parse information about an encoded video included in the bitstream. The parsing module may include the entropy decoding module 210 or be included in the entropy decoding module 210. The parsing module may be provided as one component of the decoding unit.

Figure 3:
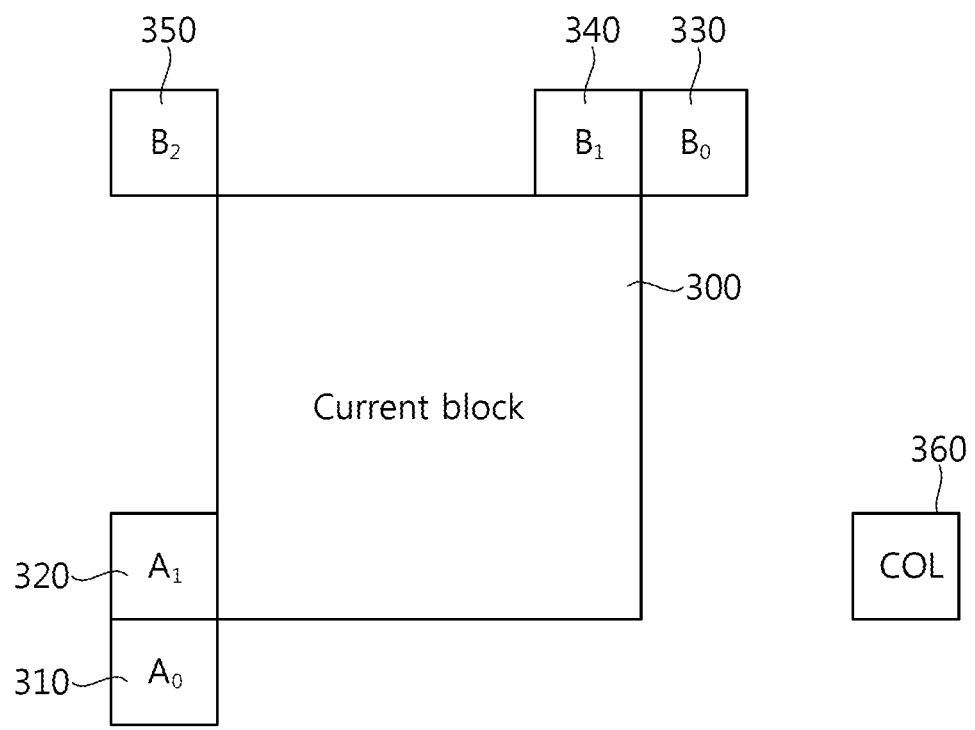
FIG. 3 schematically illustrates an available candidate block when inter prediction is performed on a current block.

FIG. 3 schematically illustrates an available candidate block when inter prediction is performed on a current block according to an exemplary embodiment.

The prediction modules of the encoding apparatus and the decoding apparatus may use a block at a preset location neighboring to a current block 300 as a candidate block. For example, in FIG. 3, two blocks $A_0$ 310 and $A_1$ 320 located at a bottom left side of the current block and three blocks $B_0$ 330, $B_1$ 340 and $B_2$ 350 located at top right and top left sides of the current block may be selected as spatial candidate blocks. In addition to the spatial neighboring blocks, a Col block 360 may be used as a temporal candidate block.

Regarding reference pictures used for inter prediction, a reference picture for the current block may be derived from a reference picture for a neighboring block or indicated by information received from the encoding apparatus. In the skip mode or merge mode, the prediction module of the decoding apparatus may use the reference picture for the neighboring block as the reference picture for the current picture. When the MVP is applied, the prediction module of the decoding apparatus may receive information indicating the reference picture for the current block from the encoding apparatus.

Pictures encoded/decoded prior to a current picture may be stored in a memory, for example, a decoded picture buffer (DPB), and be used for prediction of the current block or current picture. Pictures used for inter prediction of the current block may be derived as a reference picture list. Here, a reference picture used for inter prediction of the current block among the reference pictures included in the reference picture list may be indicated by a reference picture index. That is, the reference picture index may refer to an index indicating the reference picture used for inter prediction of the current block among the reference pictures constructing the reference picture list.

An I slice is a slice decoded by intra prediction. A P slice is a slice decoded by intra prediction or inter prediction using at most one motion vector and one reference picture. A B slice is a slice decoded by intra prediction or inter prediction using at most two motion vectors and two reference pictures. Here, the reference pictures may include short-term reference pictures (STRPs) and long-term reference pictures (LTRPs).

Here, the STRPs and the LTRPs may be reconstructed pictures stored in the DPB. The STRPs may be marked as "used for short-term reference" or "used for reference." The LTRPs may be marked as "used for long-term reference" or "used for reference." For instance, a difference in picture order count (POC) between the STRPs and the LTRP may have a value ranging from 1 to $2^{24}-1$. Here, POC may refer to display order of pictures.

Reference picture list 0 (L0) is a reference picture list used for inter prediction of a P slice or B slice. Reference picture list 1 (L1) may be used for inter prediction of a B slice. Thus, uni-directional prediction based on L0 may be performed for inter prediction of a block of a P slice, while bi-prediction based on L0 and L1 may be performed for inter prediction of a block of a B slice.

The encoding apparatus and/or the decoding apparatus may construct a reference picture list when encoding and/or decoding is performed on a P slice and a B slice through inter prediction. Here, a reference picture used for inter prediction may be designated through a reference picture index. As described above, a reference picture index may refer to an index indicating a reference picture in a reference picture list used for inter prediction.

The reference picture list may be constructed based on a reference picture set determined or generated by the encoding apparatus and the decoding apparatus. Reference pictures constructing the reference picture list may be stored in the memory, for example, the DPB. The pictures, which are encoded/decoded prior to the current picture, stored in the memory may be managed by the encoding apparatus and the decoding apparatus.

A sliding window method, which is used to manage the reference pictures, may simply manage the reference pictures by removing the reference pictures after a predetermined time since the reference pictures are stored in the memory and but have several problems. For example, a reference picture which is not needed any more may not be immediately removed, thus reducing efficiency. Moreover, the stored reference pictures are removed from the memory after the predetermined time, making it difficult to manage LTRPs.

In view of the problems of the slide window method, a memory management command operation (MMCO) method in which instruction information on management of the reference pictures is signalled directly from the encoding apparatus may be used. Particularly, in the MMCO method, a command to allocate a picture as an LTRP, a command to change an LTRP to an STRP and a command to mark an LTRP as "unused for reference" may be defined with respect to LTRP management.

However, even in use of the MMCO method, picture loss may occur during a signaling process. If a lost picture includes an MMCO command, lost MMCO information may not be reconstructed, so that the memory or DPB may not be maintained in a proper state that currently needed pictures are managed. Thus, inter prediction may be performed inaccurately.

To solve the foregoing problems, information related to a reference picture set needed for decoding a slice and/or picture may be transmitted in a sequence parameter set (SPS), a picture parameter set (PPS) and/or a slice header. Here, a reference picture list may be constructed based on the reference picture set.

The reference picture set may include reference pictures used for reference for the current picture/slice or a future picture/slice. The reference pictures used for decoding the slice and/or picture may include STRPs and LTRPs. Further, the STRPs may include forward STRPs having a lower POC than the current picture and backward STRPs having a higher POC than the current picture. Here, the reference picture set may be determined or generated with respect to each of the forward STRPs, the backward STRPs and the LTRPs.

Hereinafter, for convenience of description, a reference picture set of forward STRPs is defined as a forward STRP set, a reference picture set of backward STRPs as a backward STRP set, and a reference picture set of LTRPs as an LTRP set. For example, the forward STRP set may be represented as RefPicSetStCurrBefore, the backward STRP set as RefPicSetStCurrAfter, and the LTRP set as RefPicSetLtCurr.

Figure 4:
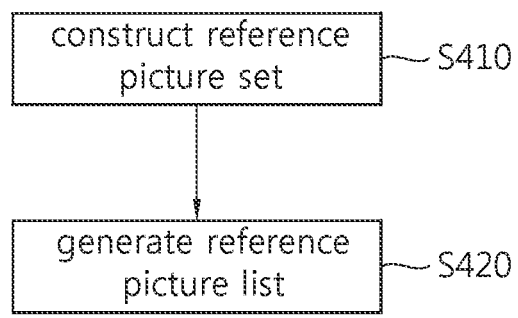
FIG. 4 is a flowchart schematically illustrating a method of constructing a reference picture list based on a reference picture set.

FIG. 4 is a flowchart schematically illustrating a method of constructing a reference picture list based on a reference picture set according to an exemplary embodiment.

The embodiment shown in FIG. 4 will be illustrated with reference to operations of the decoding apparatus for convenience of description. A process of generating a reference picture list, which will be described, may be considered as a reference picture list initialization process.

Referring to FIG. 4, the decoding apparatus may construct a reference picture set based on information on the reference picture set transmitted from the encoding apparatus (S410). For example, the reference picture set may be constructed for each picture to which inter prediction is applied.

Here, the reference picture set may include a forward STRP set, a backward STRP set and an LTRP set. Reference pictures included in each reference picture set may be specified by POCs. POC may refer to display order of pictures.

POCs of reference pictures included in the forward STRP set and the backward STRP set may be determined on relative POC. Here, information on the relative POC may be transmitted from the encoding apparatus to the decoding apparatus.

Relative POC may refer to a POC difference between two pictures in a reference picture set. In POC order, relative POC of previous reference pictures of a current picture that is, reference pictures having smaller POC than POC of the current picture, may correspond to a POC difference between a reference picture and a reference picture just before the reference picture in a reference picture set. In the POC order, relative POC of subsequent reference pictures of the current picture, that is, reference pictures having greater POC than the POC of the current picture, may corresponding to a POC difference between a reference picture and a reference picture just before the reference picture in the reference picture set.

In the forward STRP set, forward STRPs having a smaller POC value than the POC of the current picture may be disposed in descending order of POCs. That is, pictures having a smaller POC value than the POC of the current picture among pictures in the DPB may be disposed in descending order of POCs from a start of the forward STRP set.

In the backward STRP set, backward STRPs having a greater POC value than the POC of the current picture may be disposed in ascending order of POCs. That is, pictures having a greater POC value than the POC of the current picture among the pictures in the DPB may be disposed in ascending order of POCs from a start of the backward STRP set.

Reference pictures included in the LTRP set may be determined based on information on the LTRP set transmitted from the encoding apparatus. Here, the information on the LTRP set may include information for determining the reference pictures included in the LTRP set and/or POCs of the reference pictures.

Referring back to FIG. 4, the decoding apparatus may generate a reference picture list based on the reference picture set (S420).

When L0 is constructed, the decoding apparatus may sequentially allocate reference picture indices to the forward STRPs constructing the forward STRP set, the backward STRPs constructing the backward STRP set and the LTRPs constructing the LTRP set, thereby constructing the reference picture list. That is, in L0, the forward STRPs may be allocated, the backward STRPs may be added, and then the LTRPs may be finally added.

The forward STRPs constructing the forward STRP set may be added to L0 in the same order as included in the forward STRP set. That is, the forward STRPs may be disposed in descending order of the POCs in L0, and a greater reference index value may be allocated to a picture having smaller POC.

The backward STRPs constructing the backward STRP set may be added to L0 in the same order as included in the backward STRP set. That is, the backward STRPs may be disposed in ascending order of the POCs in L0, and a greater reference index value may be allocated to a picture having greater POC.

In addition, the LTRPs constructing the LTRP set may be added to L0 in the same order as included in the LTRP set.

For a B slice, L1 may be also generated in addition to L0. When L1 is constructed, the decoding apparatus may sequentially allocate reference picture indices to the backward STRPs constructing the backward STRP set, the forward STRPs constructing the forward STRP set and the LTRPs constructing the LTRP set, thereby constructing the reference picture list. That is, in L1, the backward STRPs may be allocated, the forward STRPs may be added, and then the LTRPs may be finally added.

The backward STRPs constructing the backward STRP set may be added to L1 in the same order as included in the backward STRP set. That is, the backward STRPs may be disposed in ascending order of the POCs in L1, and a greater reference index value may be allocated to a picture having greater POC.

The forward STRPs constructing the forward STRP set may be added to L1 in the same order as included in the forward STRP set. That is, the forward STRPs may be disposed in descending order of the POCs in L1, and a greater reference index value may be allocated to a picture having smaller POC. In addition, the LTRPs constructing the LTRP set may be added to L1 in the same order as included in the LTRP set.

Reference pictures added to L0 and L1 may be sequentially allocated reference picture indices.

The decoding apparatus may use first N reference pictures, that is, reference pictures having reference picture indices from 0 to N−1 (N is a natural number), among the reference pictures included in the reference picture lists as available reference pictures. Here, information on the number N of available reference pictures may be transmitted from the encoding apparatus.

In the foregoing process, the reference picture lists may be considered to be implicitly derived. When the reference picture lists are implicitly derived, the encoding apparatus and the decoding apparatus may derive the reference picture lists used for inter prediction of the current picture based on the POCs of the pictures as described above.

Meanwhile, the decoding apparatus may modify the implicitly derived reference picture lists based on information explicitly transmitted from the encoding apparatus. Here, the encoding apparatus may transmit both reference picture list modification information indicating that the implicitly derived reference picture lists are modified and entry information indicating a specific entry constructing the reference picture lists. When the reference picture lists are finally generated by being modified based on the information explicitly transmitted from the encoding apparatus, the reference picture lists may be considered to be explicitly specified.

When L0 is explicitly specified, the encoding apparatus may transmit entry information on L0. The entry information on L0 may indicate a reference picture corresponding to an index on L0. When L1 is explicitly specified, the encoding apparatus may transmit entry information on L1. The entry information on L1 may indicate a reference picture corresponding to an index on L1.

For example, when the reference picture lists are explicitly specified by the entry information, order and/or reference picture indices of the forward STRPs, the backward STRPs and the LTRPs in the reference picture lists may be different from those in the implicitly derived reference picture lists. Furthermore, when the reference picture lists are specified by the entry information, available reference pictures to be utilized may be different from those in the implicitly derived reference pictures lists.

When the reference picture lists are explicitly specified, the decoding apparatus may construct the same reference picture lists as constructed by the encoding apparatus based on the reference picture list modification information and the entry information.

In the foregoing method of implicitly deriving the reference picture lists, the reference picture set and the reference picture list are illustrated only considering available pictures for convenience of description, but the encoding apparatus and the decoding apparatus may construct a reference picture set and/or a reference picture list in view of whether reference pictures are available or used.

Figure 5:
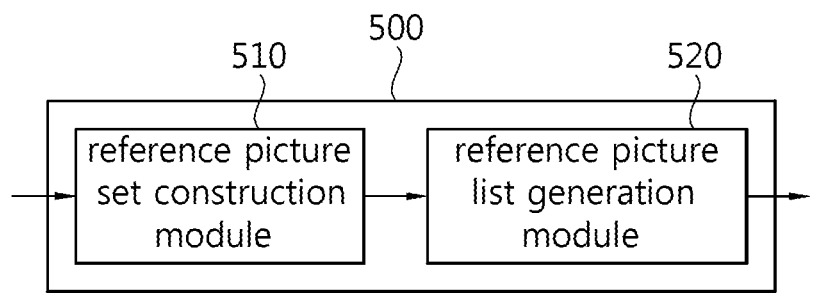
FIG. 5 is a block diagram schematically illustrating an apparatus for initializing a reference picture list.

FIG. 5 is a block diagram schematically illustrating an apparatus for initializing a reference picture list according to an exemplary embodiment.

In the embodiment shown in FIG. 5, the apparatus for initializing the reference picture list ("reference picture list initialization apparatus") 500 may include a reference picture set construction module 510 and a reference picture list generation module 520.

Referring to FIG. 5, the reference picture set construction module 510 may construct a reference picture set based on input information on the reference picture set. For instance, the reference picture set may be constructed for each picture to which inter prediction is applied.

Here, the reference picture set may include a forward STRP set, a backward STRP set and an LTRP set. Reference pictures included in each reference picture set may be specified by POCs. POC may refer to display order of pictures.

Details on operations of the reference picture set construction module 510 are the same as described in operation S410 of constructing the reference picture set in FIG. 4, and thus descriptions thereof are omitted herein.

Referring back to FIG. 5, the reference picture list generation module 520 may generate a reference picture list based on the reference picture set. The reference picture list generation module 520 may generate reference picture lists L0 and L1. Details on operations of the reference picture list generation module 510 are the same as described in operation S420 of generating the reference picture list in FIG. 4, and thus descriptions thereof are omitted herein.

The reference picture list generated by the reference picture list generation module 520 may be stored in a DPB for prediction or transferred to the prediction module for reference for prediction.

Although the present embodiment shows that initialization of the reference picture list may be carried out by a separation component, that is, the reference picture list initialization apparatus for convenience of description and understanding of the invention, the present invention is not limited to the embodiment. For instance, initialization of the reference picture list may be carried out by the memories, for example, a DPB, of the encoding apparatus and the decoding apparatus described with reference to FIGS. 1 and 2. In this instance, the reference picture list initialization apparatus may be the DPB. Alternatively, initialization of the reference picture list may be carried out by the prediction modules of the encoding apparatus and the decoding apparatus shown in FIGS. 1 and 2. In this case, the reference picture list initialization apparatus may be the prediction modules. In addition, the reference picture list initialization apparatus may be included in the encoding apparatus and the decoding apparatus as a separate component.

The same reference picture list may be used for all slices of a picture or different reference picture lists may be used by slices. Information indicating whether slices included in one picture use the same reference picture list may be signalled as a flag such as restricted_ref_pic_lists_flag, and such flag information may be included in an SPS.

restricted_ref_pic_lists_flag may indicate whether all P slices and B slices (if present) included in a picture use the same L0 and whether all B slices (if present) included in the picture use the same L1.

restricted_ref_pic_lists_flag of 1 indicates that a reference picture construction process is carried out once for each picture, not for each individual slice, and restricted_ref_pic_lists_flag of 0 indicates that the reference picture construction process is not carried out once for a picture. When restricted_ref_pic_lists_flag is 1, complexity of the reference picture construction process is improved.

When restricted_ref_pic_lists_flag is signalled as 1, flag information such as lists_modification_present_flag may be additionally signalled.

lists_modification_present_flag is a flag signal indicating whether additional information on modification of a reference picture list is present. For example, lists_modification_present_flag of 1 indicates that the additional information on the modification of the reference picture list is present. When restricted_ref_pic_lists_flag is 0, lists_modification_present_flag is apparently 1, and thus lists_modification_present_flag is not signalled.

Meanwhile, when restricted_ref_pic_lists_flag is included in the SPS, it is signalled whether the reference picture construction process is carried out once for each picture, not for each individual slice across a bitstream. Thus, such a signalling method is slightly inflexible and has limitations in transferring information on the reference picture list.

Practically, for some of bitstreams including uncomplicated and monotonous scenes, order of reference pictures in a reference picture list may not need changing by slices. On the contrary, for some of bitstreams including complicated scenes, order of reference pictures in a reference picture list may need changing by slices.

Figure 6:
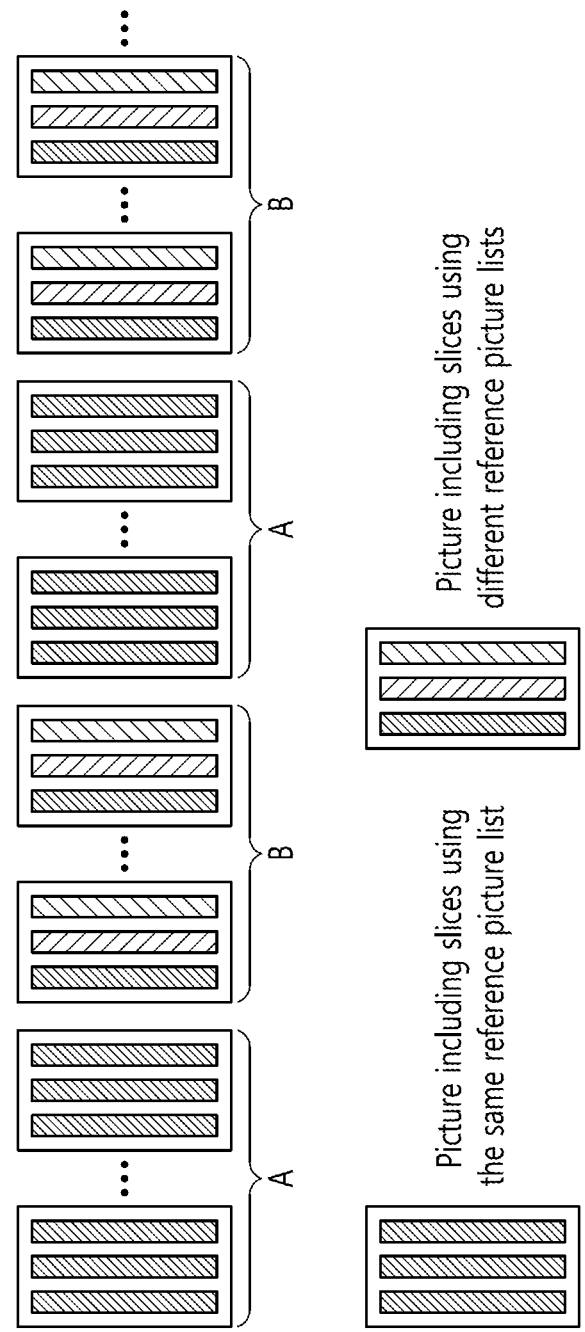
FIG. 6 illustrates a dynamic change of a reference picture list in a coded picture.

FIG. 6 illustrates a dynamic change of a reference picture list in a coded picture.

As shown in FIG. 6, slices included in one coded picture may use the same reference picture list or use different reference picture lists, respectively.

All slices included in some pictures A, for example, pictures for a specific period of time, among pictures included in a bitstream use the same reference picture list, while slices included in pictures B for another specific period of time use different reference picture lists, respectively. Some slices included in one picture may use the same reference picture list, while other slices may use different reference picture lists.

In the bitstream of FIG. 6, when restricted_ref_pic_lists_flag is signalled in an SPS, restricted_ref_pic_lists_flag is 0. Thus, the decoding apparatus cannot take advantage of possibility to apply single reference picture list construction per picture for the period where reference picture list within a picture is identical, for example, the pictures A.

The present invention suggest changing a signaling location of restricted_ref_pic_lists_flag or/and lists_modification_present_flag described above to improve a feature of limiting construction of a reference picture list.

Table 1 illustrates a picture parameter set (PPS) according to an exemplary embodiment of the present invention.

TABLE 1

|  | Descriptor |
| --- | --- |
| pic_parameter_set_rbsp( ) { | |
| ... | |
| restricted_ref_pic_lists_flag | u(1) |
| if( restricted_ref_pic_lists_flag ) | |
| lists_modification_present_flag | u(1) |
| ... | |
| } | |

Referring to Table 1, restricted_ref_pic_lists_flag indicates whether all P slices and B slices (if present) included in a picture use the same L0 and whether all B slices (if present) included in the picture use the same L1. restricted_ref_pic_lists_flag of 1 indicates that all slices included in a picture use the same reference picture list, while restricted_ref_pic_lists_flag of 0 indicates that all slices included in the picture do not use the same reference picture lists.

lists_modification_present_flag indicates whether additional information on modification of a reference picture list is present. lists_modification_present_flag of 1 indicates that an additional syntax element about modification of the reference picture list is present in a slice level, for example, a slice header, while lists_modification_present_flag of 0 indicates that an additional syntax element about modification of the reference picture list is not present in the slice header.

In the present embodiment, both restricted_ref_pic_lists_flag and lists_modification_present_flag are signalled, being included in a PPS, instead of in an SPS. In this case, whenever the reference picture list is modified in the bitstream, modification of the reference picture list may be signalled in real time. The encoding apparatus and the decoding apparatus may easily encode and decode information on whether the construction of the reference picture list is applied to each individual picture.

Tables 2 and 3 illustrates an SPS and a PPS according to an exemplary embodiment of the present invention.

TABLE 2

|  | Descriptor |
| --- | --- |
| seq_parameter_set_rbsp( ) { | |
| ... | |
| lists_modification_present_flag | u(1) |
| ... | |
| } | |

TABLE 3

|  | Descriptor |
| --- | --- |
| pic_parameter_set_rbsp( ) { | |
| ... | |
| restricted_ref_pic_lists_flag | u(1) |
| ... | |
| } | |

Referring to Table 2, lists_modification_present_flag indicates whether additional information on modification of a reference picture list is present. lists_modification_present_flag of 1 indicates that an additional syntax element about modification of the reference picture list is present in a slice level, for example, a slice header, while lists_modification_present_flag of 0 indicates that an additional syntax element about modification of the reference picture list is not present in the slice header.

lists_modification_present_flag may be signalled, being included in the SPS, as show in Table 2.

Referring to Table 3, restricted_ref_pic_lists_flag indicates whether all P slices and B slices (if present) included in a picture use the same L0 and whether all B slices (if present) included in the picture use the same L1.

restricted_ref_pic_lists_flag may be signalled, being included in the PPS instead of in the SPS.

Figure 7:
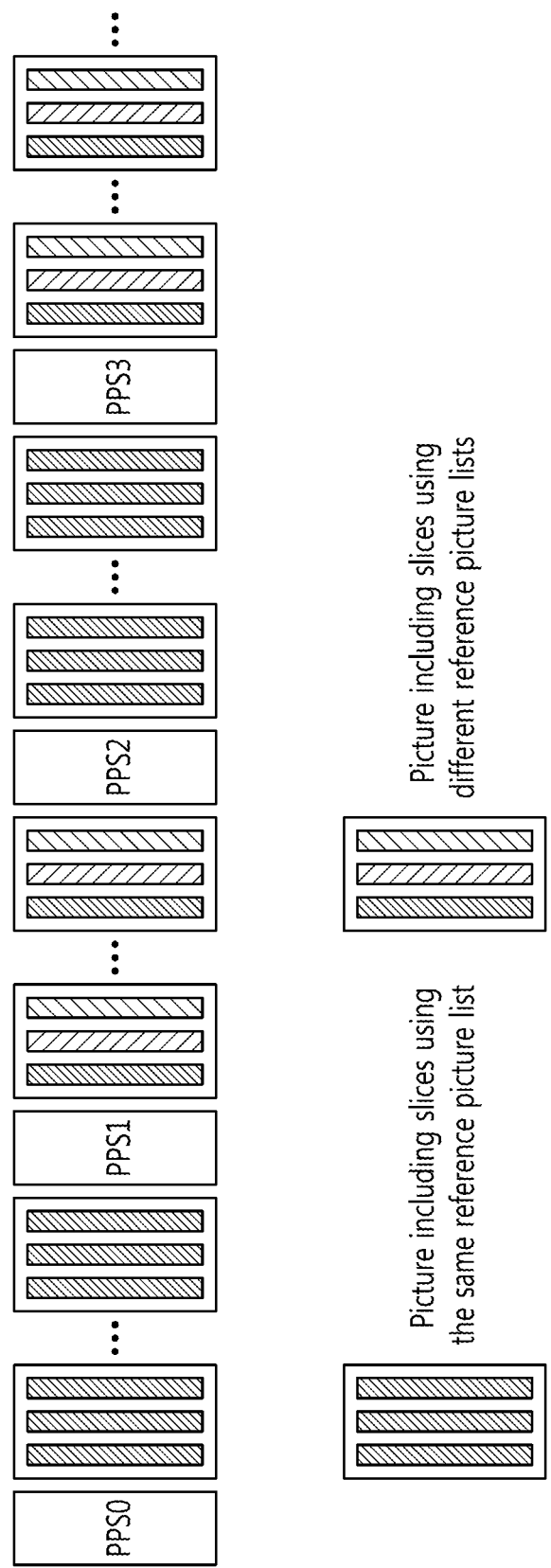
FIG. 7 illustrates a dynamic change of a reference picture list according to the present invention.

FIG. 7 illustrates a dynamic change of a reference picture list according to the present invention.

As shown in FIG. 7, slices included in one coded picture may use the same reference picture list or use different reference picture lists, respectively. When a construction of the reference picture list is modified, modified information may be signalled by each picture, thereby efficiently signalling information on the reference picture list and enhancing coding efficiency.

For PPS 0 and PPS 2 for pictures each of which includes slices using the same reference picture list, restricted_ref_pic_lists_flag is signalled as 1, in which case lists_modification_present_flag will be additionally signalled. That is, when new information is added to a PPS, a new PPS is signalled accordingly.

For PPS 1 and PPS 3 for pictures each of which includes slices using different reference picture lists, restricted_ref_pic_lists_flag is signalled as 0.

Meanwhile, information on whether a reference picture list is modified is signaled for each picture, restricted_ref_pic_lists_flag may be signalled, being included in parameter information other than a PPS. For example, restricted_ref_pic_lists_flag may be signaled, being included in a video usability information (VUI) parameter.

Tables 4 and 5 illustrate a VUI parameter and a PPS according to an exemplary embodiment of the present invention.

TABLE 4

| | Descriptor |
|---|---|
| vui_parameters( ) { | |
| ... | |
|    restricted_ref_pic_lists_flag | u(1) |
| ... | |
| } | |

TABLE 5

| | Descriptor |
|---|---|
| pic_parameter_set_rbsp( ) { | |
| ... | |
|    lists_modification_present_flag | u(1) |
| ... | |
| } | |

Referring to Table 4, restricted_ref_pic_lists_flag indicates whether all P slices and B slices (if present) included in a picture use the same L0 and whether all B slices (if present) included in the picture use the same L1.

restricted_ref_pic_lists_flag may be signalled, being included in the VUI parameter instead of in the SPS.

Referring to Table 5, lists_modification_present_flag indicates whether additional information on modification of a reference picture list is present. lists_modification_present_flag of 1 indicates that an additional syntax element about modification of the reference picture list is present in a slice level, for example, a slice header, while lists_modification_present_flag of 0 indicates that an additional syntax element about modification of the reference picture list is not present in the slice header.

lists_modification_present_flag may be signalled separately from restricted_ref_pic_lists_flag, being included in the PPS, as show in Table 5.

FIG. 8 is a flowchart illustrating a video decoding method according to an exemplary embodiment of the present invention.

First, the decoding apparatus receives and derives first information indicating whether the same reference picture list is applied to slices included in a picture (S810).

The first information may be restricted_ref_pic_lists_flag, and such flag information may be received, being included in a PPS or a VUI parameter instead of in an SPS.

When restricted_ref_pic_lists_flag is 0 (S820), which indicates that the slices in the picture does not use the same reference picture list, the decoding apparatus constructs a reference picture list using modification information on the reference picture list transmitted in a slice level, that is, information on an additional reference picture list that may be modified from the initial reference picture list (S830).

When restricted_ref_pic_lists_flag is 1 (S820), the decoding apparatus may receive second information indicating whether additional information on modification of the reference picture list is present.

The second information may be lists_modification_present_flag, and such flag information may be transmitted, being included in the SPS as conventionally or in the PPS.

When lists_modification_present_flag is 1 (S840), which indicates that the additional information on modification of the reference picture list is present, the decoding apparatus constructs a reference picture list using the additional information on the reference picture list (S830).

However, when lists_modification_present_flag is 0 (S840), one reference picture list is applied to the picture, the decoding apparatus may construct the initial reference picture list using information on a reference picture list transmitted in an SPS level or PPS level, and the initial reference picture list may be used as the reference picture list for the picture (S850).

The reference picture list may be generated based on a reference picture set, details of which are substantially the same as mentioned above with reference to FIGS. 4 and 5 and thus are not made herein to avoid redundancy.

As described above, the present invention discloses a method and an apparatus for signaling by a picture whether a construction of a reference picture list is modified when constructing the reference picture list. The present invention may change the construction of the reference picture list corresponding to characteristics of pictures when constructing the reference picture list.

Although methods of illustrative systems have been described with a series of stages or blocks based on the flowcharts, the present invention is not limited to the foregoing sequence of the stages. Some stages may be carried out in different order from described above or at the same time. Further, it should be noted that as the aforementioned embodiments may include various aspects of examples, combinations of the embodiments may be also understood as exemplary embodiments of the present invention. Thus, it will be appreciated by those skilled in the art that changes, modifications and alternatives may be made in these exemplary embodiments without departing from the principles and spirit of be the invention, the scope of which is defined in the appended claims and their equivalents.

The invention claimed is:

1. A video encoding method performed by an encoding apparatus, the method comprising:
    deriving a reference picture list for inter prediction;
    determining whether intra prediction or the inter prediction is applied to a current block in a current picture;
    based on the inter prediction being applied to the current block, deriving a prediction sample of the current block based on a reference picture included in the reference picture list;
    generating a reconstructed sample based on the prediction sample;
    determining whether to signal information on modification of reference picture lists;
    deriving a lists modification present flag indicating whether the information on modification of the reference picture lists is present based on the result of the determination;
    deriving prediction mode information related to whether the intra prediction or the inter prediction is applied to the current block;
    encoding video information including the prediction mode information for the current block and the lists modification present flag,
    wherein the reference picture list includes reference pictures used for the inter prediction with regard to a slice comprising the current block,
    wherein the lists modification present flag is comprised in a picture parameter set (PPS) of the video information.

2. The video encoding method of claim 1, wherein the video information includes a restricted reference picture list flag in a sequence parameter set (SPS) of the video information,
    wherein the restricted reference picture list flag indicates whether slices that belong to a current picture have an identical reference picture list, wherein the lists modification present flag is comprised in the PPS when a value of the restricted reference picture list flag is 0.

3. The video encoding method of claim 2, wherein the identical reference picture list is constructed for the slices comprised in the current picture when the value of the restricted reference picture list flag is 1.

4. The video encoding method of claim 1, wherein the reference picture list is derived based on at least one of a forward short-term reference picture (STRP) set comprising pictures having smaller picture order count (POC) than POC of the current picture, a backward STRP set comprising pictures having greater POC than the POC of the current picture, and a long-term reference picture (LTRP) set.

5. The video encoding method of claim 4, wherein the reference picture list includes reference picture list 0 and reference picture list 1,
wherein the reference picture list 0 is constructed by sequentially allocating reference picture indices to forward STRPs forming the forward STRP set, backward STRPs forming the backward STRP set and LTRPs forming the LTRP set; and
wherein the reference picture list 1 is constructed by sequentially allocating reference picture indices to the backward STRPs forming the backward STRP set, the forward STRPs forming the forward STRP set and the LTRPs forming the LTRP set when the prediction target block is a B slice.

6. The video encoding method of claim 1, wherein deriving the reference picture list comprises:
deriving a temporary reference picture list based on decoded pictures; and
deriving the temporary reference picture list as the reference picture list when the lists modification present flag indicates that the information on modification of the reference picture lists is not present.

7. The method of claim 1, wherein deriving the reference picture list comprises:
deriving a temporary reference picture list based on decoded pictures; and
deriving the reference picture list by modifying the temporary reference picture list based on the information on modification of the reference picture lists when the lists modification present flag indicates that the information on modification of the reference picture lists is present.

8. A non-transitory decoder-readable storage medium storing a bitstream generated by a method, the method comprising:
deriving a reference picture list for inter prediction;
determining whether intra prediction or the inter prediction is applied to a current block in a current picture;
based on the inter prediction being applied to the current block, deriving a prediction sample of the current block based on a reference picture included in the reference picture list;
generating a reconstructed sample based on the prediction sample;
determining whether to signal information on modification of reference picture lists;
deriving a lists modification present flag indicating whether the information on modification of the reference picture lists is present based on the result of the determination;
deriving prediction mode information related to whether the intra prediction or the inter prediction is applied to the current block;
encoding video information including the prediction mode information for the current block and the lists modification present flag;
generating the bitstream including the video information,
wherein the reference picture list includes reference pictures used for the inter prediction with regard to a slice comprising the current block,
wherein the lists modification present flag is comprised in a picture parameter set (PPS) of the video information.

9. The non-transitory decoder-readable storage medium of claim 8, wherein the video information includes a restricted reference picture list flag in a sequence parameter set (SPS) of the video information,
wherein the restricted reference picture list flag indicates whether slices that belong to a current picture have an identical reference picture list,
wherein the lists modification present flag is comprised in the PPS when a value of the restricted reference picture list flag is 0.

10. The non-transitory decoder-readable storage medium of claim 9, wherein the identical reference picture list is constructed for the slices comprised in the current picture when the value of the restricted reference picture list flag is 1.

11. The non-transitory decoder-readable storage medium of claim 8, wherein the reference picture list is derived based on at least one of a forward short-term reference picture (STRP) set comprising pictures having smaller picture order count (POC) than POC of the current picture, a backward STRP set comprising pictures having greater POC than the POC of the current picture, and a long-term reference picture (LTRP) set.

12. The non-transitory decoder-readable storage medium of claim 11, wherein the reference picture list includes reference picture list 0 and reference picture list 1,
wherein the reference picture list 0 is constructed by sequentially allocating reference picture indices to forward STRPs forming the forward STRP set, backward STRPs forming the backward STRP set and LTRPs forming the LTRP set; and
wherein the reference picture list 1 is constructed by sequentially allocating reference picture indices to the backward STRPs forming the backward STRP set, the forward STRPs forming the forward STRP set and the LTRPs forming the LTRP set when the prediction target block is a B slice.

13. The non-transitory decoder-readable storage medium of claim 8, wherein deriving the reference picture list comprises:
deriving a temporary reference picture list based on decoded pictures; and
deriving the temporary reference picture list as the reference picture list when the lists modification present flag indicates that the information on modification of the reference picture lists is not present.

14. A transmission method of data for image, the method comprising:
obtaining a bitstream of video information including prediction mode information for a prediction sample of a current block and a lists modification present flag; and
transmitting the data including the bitstream of the video information including the prediction mode information and the lists modification present flag,
wherein whether intra prediction or the inter prediction is applied to the current block in a current picture is determined, the prediction mode information is generated based on a result of determination as to whether the intra prediction or the inter prediction is applied to the current block, and based on the inter prediction being applied to the current block, the prediction sample of the current block is derived based on a reference picture included in a reference picture list, wherein the lists modification present flag is generated based on a result of determination as to whether information on modification of reference picture lists is signaled, wherein the lists modification present flag indicates whether the information on modification of the reference picture lists is present, wherein the reference picture list includes reference pictures used for the inter prediction with regard to a slice comprising the current block, wherein the lists modification present flag is comprised in a picture parameter set (PPS) of the video information.

* * * * *